Figure 3:
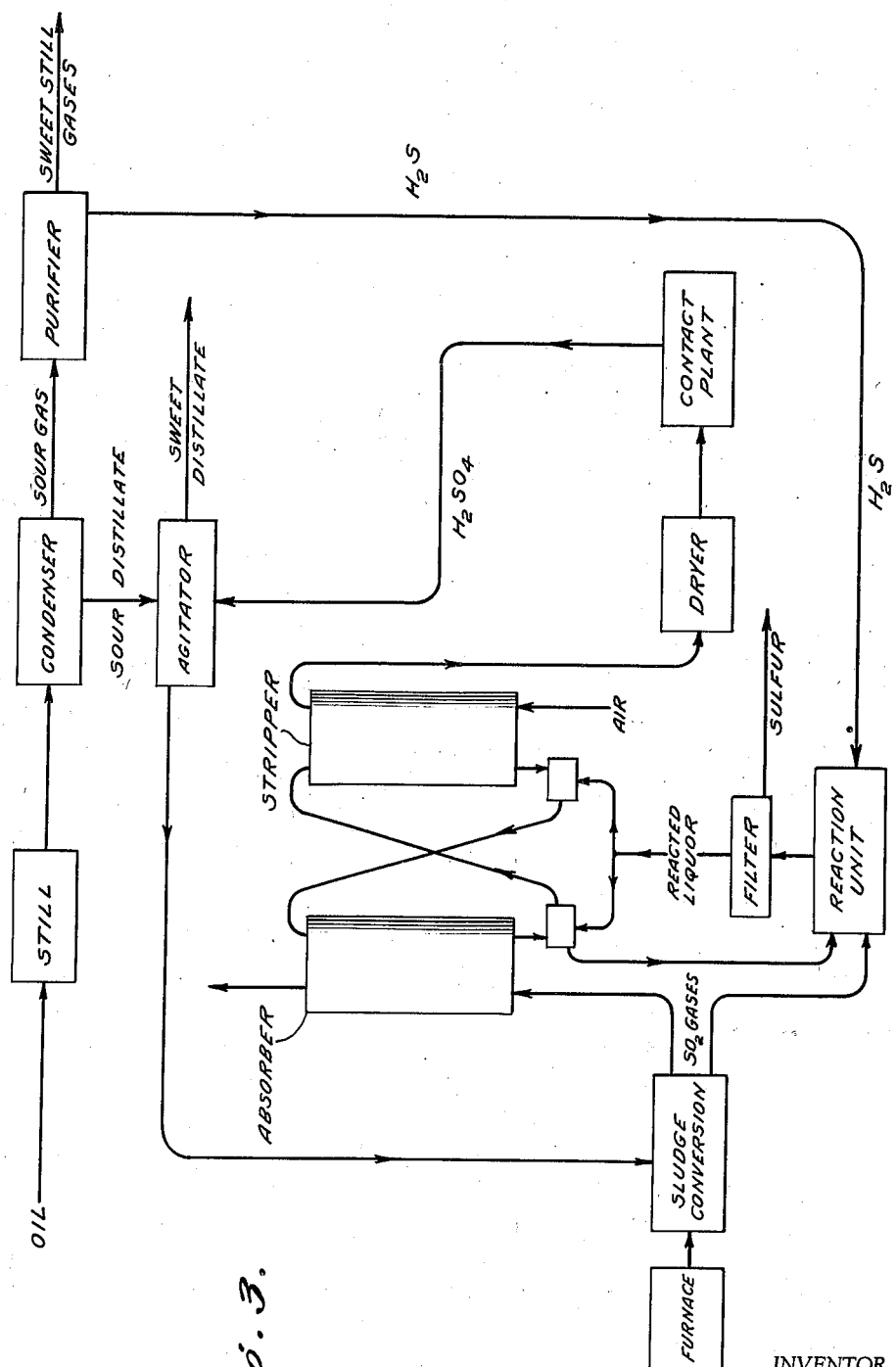

April 4, 1939.  T. C. OLIVER  2,153,337
RECOVERY OF SULPHUR FROM PETROLEUM
Filed Aug. 25, 1936   2 Sheets-Sheet 1
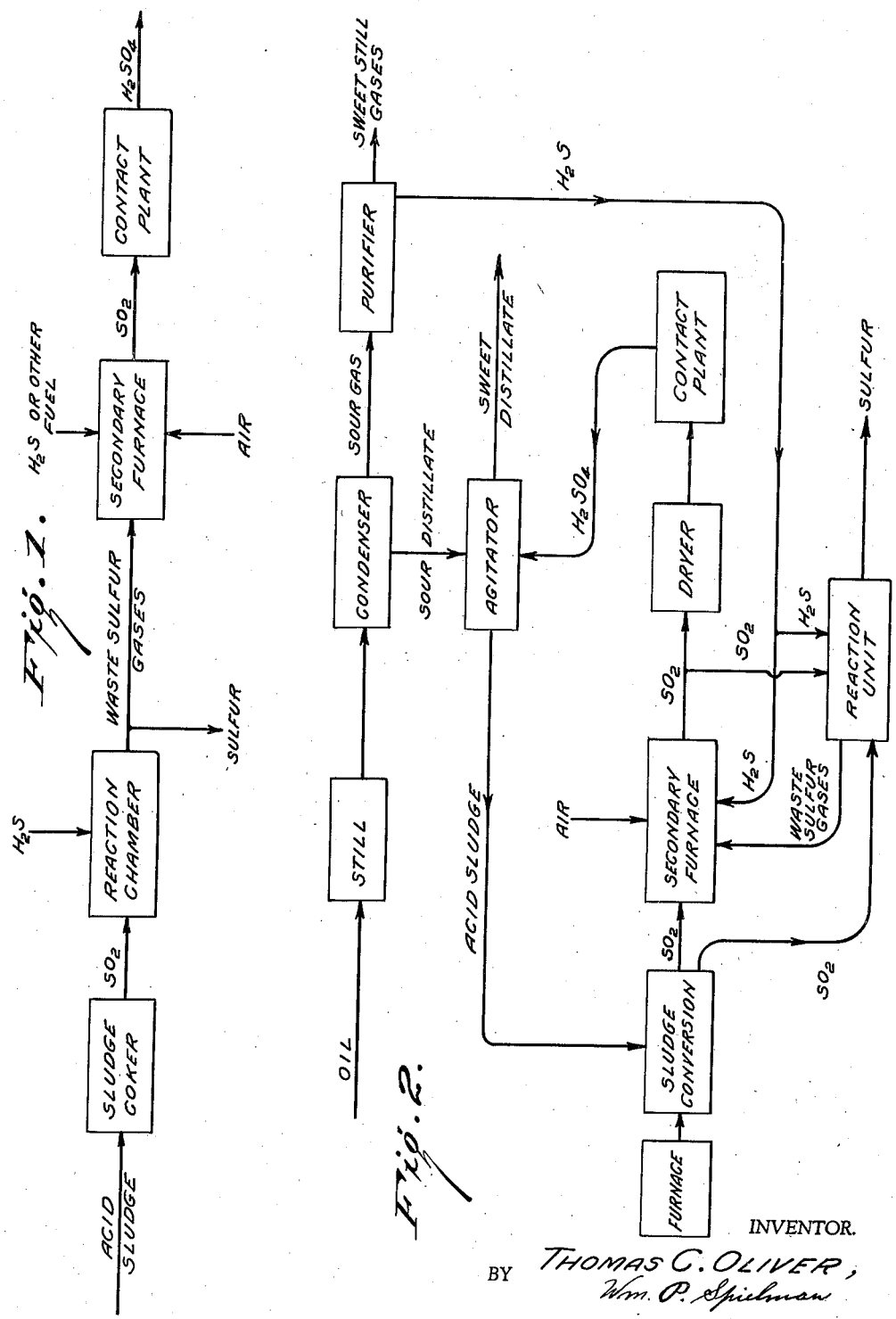
INVENTOR.
BY Thomas C. Oliver,
Wm. P. Spielman
ATTORNEY.

April 4, 1939. T. C. OLIVER 2,153,337
RECOVERY OF SULPHUR FROM PETROLEUM
Filed Aug. 25, 1936 2 Sheets-Sheet 2

INVENTOR.
BY *Thomas C. Oliver,*
*Wm. P. Spielman*
ATTORNEY.

Patented Apr. 4, 1939

2,153,337

UNITED STATES PATENT OFFICE 2,153,337

RECOVERY OF SULPHUR FROM PETROLEUM

Thomas Clifford Oliver, Jackson Heights, Long Island, N. Y., assignor to Chemical Construction Corporation, New York, N. Y., a corporation of Delaware Application August 25, 1936, Serial No. 97,729

1 Claim. (Cl. 23—167)

This invention relates to the recovery and utilization of sulphur from sulphur bearing petroleum oils, and more particularly to the production of free sulphur, sulphur trioxide and sulphuric acid from the sulphur contained in such oils.

An object of the invention is the provision of a process for the maximum recovery of the sulphur contained in crude or sulphur bearing oils, both that obtained in the form of hydrogen sulphide and that retained in the oil and recovered during subsequent purification processes.

Another object is the provision of a process in which hydrogen sulphide from a gaseous fraction of the crude oil is reacted with sulphur dioxide obtained from the purification of the liquid fraction, in order to produce elemental sulphur.

Still another object is the improvement of an existing recirculatory process for the recovery and reuse of the sulphuric acid used in the refining of sulphur bearing petroleum oils, whereby sulphur recovered from the oil is used to make up for losses of sulphur in the system.

Further objects include the modification and improvement of existing processes for the recovery of sulphur from acid sludge from the sulphuric acid refining of petroleum fractions in such a manner as to utilize hydrogen sulphide as fuel in a secondary combustion stage, or as a reagent for the production of the free sulphur by a liquid phase reaction.

Additional objects of the invention will become apparent from the following description and will be pointed out in the appended claim.

In the refining of sulphur bearing petroleum oils and petroleum oil fractions by distillation, and particularly in processes involving cracking, a low-boiling or gaseous fraction is removed. This gaseous fraction is known as "sour gas" and consists of hydrocarbons of relatively low boiling point together with hydrogen sulphide and other impurities. The liquid fraction from which the sour gas has been removed is known as the "sour distillate" and contains, in addition to saturated and unsaturated hydrocarbons, sulphur compounds such as mercaptans, sulphides, thio compounds, etc. Usually about one-third of the total sulphur content of the crude oil is contained in the sour gas, another third in the sour distillate fraction and the balance is lost in the petroleum coke. In ordinary refining processes, the sour distillate fraction is agitated with sulphuric acid and permitted to settle, whereby an upper oily fraction known as "sweet distillate" is obtained. The lower fraction from this agitation contains most of the sulphuric acid together with tar and the sulphur impurities that were contained in the sour distillate.

In accordance with a well known commercial process, known as the "Chemico sludge conversion process", and more particularly described in Hechenbleikner Patent No. 1,953,225, Clark Patent No. 2,044,419, Bartholomew Patent No. 2,028,713 and Rumple Patent No. 2,028,725, the sulphur content of this acid sludge is recovered by thermal decomposition of the sludge in a rotary kiln under conditions such that the major part of its sulphur content is evolved in the form of sulphur dioxide gases. These gases may also contain hydrocarbons and other combustible impurities, and they are, therefore, subjected to secondary combustion with addition of air in a secondary furnace. The sulphur dioxide gases so obtained, with or without subsequent adjustment of concentration if necessary, may then be admitted to a contact sulphuric acid plant for the production of sulphuric acid and may be reused in this form for purification of more of the sour distillate.

In accordance with the present invention the hydrogen sulphide which may be recovered from the sour gas by known purification processes is reacted with sulphur dioxide gases obtained from the "Chemico" sludge conversion process above referred to, in order to produce free sulphur, or is burned to increase the sulphur content of these gases, or both.

It is well known that the reaction between hydrogen sulphide and sulphur dioxide, either by vapor phase or liquid phase processes, is slow and inefficient, and that considerable amounts of unreacted sulphur dioxide and/or hydrogen sulphide frequently escape from the reaction unit. The present invention makes use of the inefficiency of this reaction by introducing the exit gases therefrom into the secondary furnace in the "Chemico" process, or by passing the reacted solution to a stripping tower which is used therein, thereby increasing the sulphur content of the gases passing to a contact plant and turning to advantage a condition that has hitherto been considered as a serious defect in the utilization of hydrogen sulphide from oil refineries. It is understood, however, that while this method of utilization may form a preferred modification in some cases, the invention in its broader aspects is not limited thereto, and that hydrogen sulphide from other sources may be utilized as fuel for the secondary furnace where this may be desirable.

The invention will be described in conjunction with the accompanying drawings, in which flow diagrams of certain embodiments thereof are diagrammatically illustrated. In these drawings.

Fig. 1 illustrates a process for the production of sulphuric acid from acid sludge in which hydrogen sulphide is used to react with sulphur dioxide from an acid sludge kiln for the production of sulphur.

Fig. 2 outlines in diagrammatic form a flow sheet of a process in which a part of the available sulphur content of a crude oil is recovered in the form of sulphur by vapor phase reaction between sulphur dioxide and hydrogen sulphide and the remainder is converted to sulphuric acid to make up for treating losses in the system.

Fig. 3 is a diagrammatic outline of a process employing a liquid phase reaction for the same purpose.

Referring to Fig. 1, acid sludge having a greater or lesser content of hydrocarbons is fed to a rotary sludge coker, or kiln, which may be of the type described in Heckenbleikner Patent No. 1,953,225, referred to above. The sulphur dioxide gases issuing from this kiln may be passed through a condenser (not shown) in case they contain an excessive amount of hydrocarbons, and are then passed to a reaction chamber in which they are reacted with hydrogen sulphide gas.

When the amount of sulphuric acid obtainable from the "Chemico" process is greater than the acid requirements of the petroleum refinery, or when for other reasons it is desired to produce elemental sulphur, hydrogen sulphide is introduced into the reaction chamber without the addition of air. This reaction chamber is preferably provided with a catalyst for promoting the reaction between hydrogen sulphide and sulphur dioxide in accordance with the following equation—

$$2H_2S + SO_2 = 2H_2O + 3S$$

The catalyst may consist, for example, of silica gel impregnated with a metal oxide such as iron oxide, chromium oxide, manganese oxide, cobalt oxide, nickel oxide, vanadium oxide, aluminum oxide, or other oxides or metals of the 5th and 6th groups of the periodic system. Similarly, bog iron may be used, also zeolites containing aluminum and silica, or non-siliceous base exchange bodies containing amphoteric metal oxides such as oxides of aluminum, vanadium, or chromium. Catalysts comprising bauxite which may be given a preliminary calcination may also be used. Catalysts of the above described classes operate at temperatures of 175–300° C., and are capable of regeneration by heating with hot gases at higher temperatures.

When sulphur is produced by the reaction of hydrogen sulphide and sulphur dioxide in the above manner it is preferably recovered from the gases by means of a Cottrell precipitator, or by cooling and filtering or condensing. The gases, after removal of the free sulphur and containing residual sulphur dioxide together with hydrocarbons and/or hydrogen sulphide, are then passed to a secondary furnace where the hydrocarbons are burned with air, with or without the addition of more hydrogen sulphide or other fuel, and where the sulphur dioxide content of the gases may be adjusted to a strength suitable for use in the contact sulphuric acid process by the combustion of the additional hydrogen sulphide or the admission of excess air. The gases are then passed, after suitable dehydration and purification if necessary, to a contact sulphuric acid plant for conversion to sulphur trioxide and sulphuric acid.

In the system shown in Fig. 2, crude petroleum oil or a fraction thereof is distilled in a still, and the vapors are passed to a condenser. The sour gas from this condenser may contain hydrogen sulphide in concentrations up to 6% by volume, and must be purified from this material in order to obtain sweet still gases. Probably a purification system is employed, such as the Girdler triethanolamine process or the Koppers sodium phenolate process, which recovers the hydrogen sulphide in the form of a strong $H_2S$ gas, although this is not absolutely necessary for the successful operation of the present invention. On the contrary, any purification process may be resorted to which will separate the hydrogen sulphide from the hydrocarbon gases, and the invention is not limited in this respect.

From the condenser the sour distillate is passed to a sulphuric acid treating plant where it is agitated or mixed with concentrated sulphuric acid in order to produce a sweet distillate and an acid sludge containing the sulphide impurities, unsaturates, and the major part of the sulphuric acid. Acid for this treatment is preferably obtained in a circulatory process from sulphur dioxide evolved from the acid sludge by the "Chemico sludge conversion process", as has been explained, and theoretically no additional sulphuric acid need be used if perfect recovery could be accomplished. In actual practice, however, there are always losses resulting from incomplete evolution of sulphur dioxide in the sludge kiln, incomplete conversion of sulphur dioxide to sulphur trioxide in the contact plant, and particularly treating losses in the agitator due to the reducing action of the hydrocarbons of the oil upon the sulphuric acid and incomplete separation of acid from the refined oil. (In the agitator these losses may amount to as much as 16% of the sulphuric acid used.) It is a further object of the invention to make up for these losses by the combustion of suitable amounts of hydrogen sulphide in the secondary furnace, and preferably this hydrogen sulphide is obtained from the sour gas in the above described manner. By this means the contact plant of the refinery will always produce sufficient acid for operation at capacity without having to purchase sulphur or sulphur-containing materials.

The acid sludge from the treating plant is collected and may be further treated for the reduction of its hydrocarbon content if desired, after which it is introduced into the sludge conversion kiln of a "Chemico" sludge conversion plant. In this kiln it is subjected to heating by gases or hot coke from a furnace, the heating taking place in a plurality of zones, and gases containing sulphur dioxide and hydrocarbons are evolved from the kiln. In the normal operation of the process these sulphur dioxide gases, which may be strong gases containing as high as 80% $SO_2$ or may be weaker gases, are passed to condensers where their condensable hydrocarbons and water are removed and then to a secondary furnace where their uncondensable hydrocarbons are burned with air, additional heating being provided by the introduction of combustible oils or gases, and in accordance with the present invention these are preferably hydrogen sulphide gases from the sour gas purifier. These gases may be burned in sufficient amounts, over and above those necessary to make up for treating and other losses in the system, to compensate for the sulphur dioxide withdrawn to react with the remainder of the hydrogen sulphide from the sour gas purifier for the production of sulphur, as will now be explained.

In the refining of high sulphur oils, it frequently happens that more sulphur is recovered from the oil than is necessary to make up for treating and conversion losses in the system. In such cases it is highly desirable to recover this excess in the form of free sulphur, not only because of its light weight and ease of storage and shipping but also because it can be sold for a wide range of purposes, for example as an insecticide. The present invention provides a system whereby the excess hydrogen sulphide from the sour gas purifier may be reacted with sulphur dioxide withdrawn from the sludge kiln, or from the secondary furnace if the sludge kiln gases contain too much hydrocarbon, for the production of sulphur.

The unit in which this reaction is carried out may be similar to that described in conjunction with Fig. 1; that is to say, a converter provided with a catalyst for vapor phase reaction at temperatures of 175–300° C. or higher. In this case the gases leaving the catalyst are passed through a Cottrell precipitator, or through coolers and bag filters, for the recovery of free sulphur after which they are introduced together with air into the secondary furnace as shown on the drawings. Additional hydrogen sulphide may also be admitted to this furnace, as indicated, and the gas from both sources serves both to increase the sulphur dioxide content of the gases leaving the furnace and to provide heat for the combustion. The gases leaving the secondary furnace after cooling are passed to a dryer, which is preferably in the form of a tower irrigated with strong sulphuric acid, and finally to a contact sulphuric acid plant where their sulphur dioxide content is oxidized to sulphur trioxide in the presence of a catalyst, preferably containing vanadium. The sulphur trioxide is preferably absorbed in the usual manner to produce strong sulphuric acid or oleum, which are reused in the refining process. By regulating the amount of hydrogen sulphide entering the furnace it is easy to produce an amount of acid equal to that used originally, the remainder of the hydrogen sulphide being converted to free sulphur.

The modification of Fig. 3 represents a process in which the present invention is employed in conjunction with plants using liquid purification of sulphur dioxide gases from an acid sludge kiln. Such a plant is described in the Bartholomew and Rumple Patents Nos. 2,028,713 and 2,028,725 referred to above and the invention will be described in conjunction with the process of these patents.

Referring to Fig. 3, it will be seen that the steps of distilling sulphur bearing petroleum or petroleum fractions and obtaining a sour gas and a sour distillate therefrom are the same as those in Fig. 2. Similarly, the agitation of the sour distillate with sulphuric acid to obtain a sweet distillate and acid sludge, the thermal decomposition of this sludge in a sludge conversion stage under conditions such that a substantial part of its sulphur content is evolved as sulphur dioxide, and the separation of sulphur from the sour gas in the form of hydrogen sulphide are also the same as those in the modification of Fig. 2. The treatment of the sulphur dioxide gases from the sludge conversion stage is carried out as described in the Bartholomew and Rumple patents referred to above, and does not usually require a secondary furnace for the combustion of hydrocarbons. Instead of this, sulphur dioxide gases from the sludge conversion stage are passed after suitable cooling to a sulphur dioxide absorber where they flow counter to a spray of cold water or dilute sulphur dioxide solution which absorbs practically all of their sulphur dioxide content. Remaining fixed gases are vented to the atmosphere, while the aqueous solution of sulphur dioxide is collected in a strong liquor tank from which it is passed to a stripping tower for the removal of its sulphur dioxide content. The stripped liquor is collected in a weak liquor tank and is returned from this tank into the absorber for reuse while the strong sulphur dioxide gases from the top of the stripper are passed to a dryer and then to a contact sulphuric acid plant.

In accordance with the present invention, strong liquor is continuously or intermittently withdrawn from the strong liquor tank of the absorber and introduced into a reaction unit together with hydrogen sulphide gases from the sour gas purifier, preferably with heating to temperatures of 80–90° C. (See British Patent 8,164 of 1907 and Wyld-Sulfuric Acid-Raw Materials, pp. 43–44.) Liquor from this reaction unit is likewise continuously or intermittently withdrawn through a filter or centrifuge for the removal of sulphur and is then reintroduced into the absorber or stripper, depending upon its sulphur dioxide content. If the amount of hydrogen sulphide introduced into the reaction unit is only sufficient for reacting with part of the sulphur dioxide dissolved in the water or if for other reasons the reaction in this unit is not carried to completion, then the filtrate from the sulphur filter may be introduced into the top of the stripping tower for expelling the remainder of its sulphur dioxide content in the form of a sulphur dioxide gas of a strength suitable for catalytic oxidation to sulphur trioxide. On the other hand, if the major portion of the sulphur dioxide in the solution has been reacted with hydrogen sulphide, then the spent liquor from the reaction unit, after filtering, may be introduced into the weak liquor tank at the base of the stripping tower, from which it is passed to the absorber to become strengthened by the absorption of sulphur dioxide gases from the sludge conversion unit.

Instead of reacting sulphur dioxide solution from the absorber with hydrogen sulphide from the sour gas purifier, it may be convenient to carry out a liquid phase reaction between the hydrogen sulphide from this source and sulphur dioxide gases taken directly from the sludge conversion kiln. In such cases the same reaction unit may be used, it being only necessary to take off gases from the kiln along the line indicated in the drawings and introduce them into water maintained at a temperature of 80–90° C. along with the hydrogen sulphide gases. After the reaction has progressed to a suitable extent, portions of the liquid may then be continuously or intermittently passed through the filter, the filtrate being introduced into the reaction unit. Obviously, the two processes may also be operated simultaneously in the same reaction unit, liquid from the absorber being withdrawn and introduced into the reaction unit while gases from the sludge conversion kiln and hydrogen sulphide gases from the sour gas purifier are admitted. The exact method of operation will, of course, be dependent upon the particular local conditions at an oil refinery using the process, and will be determined in each case by the skilled chemical engineer.

While the invention has been described in conjunction with certain specific processes, and certain temperatures and reaction conditions have been given, it is understood that these are given by way of illustration of the best method known to me of carrying the invention into effect, and that in its broader aspects the invention is not limited thereby.

What I claim is:

In the refining of petroleum by a process involving the agitation of a sour distillate with an amount of sulphuric acid sufficient to produce a sweet distillate and acid sludge, the thermal decomposition of the acid sludge in a sludge decomposition zone under conditions such that a substantial part but not all of its sulphur content is evolved in the form of sulphur dioxide gas, and the reconversion of this sulphur dioxide gas to sulphuric acid for reuse in the process, the steps which consist of distilling a sulphur-bearing petroleum oil and thereby obtaining a sour gas and the sour distillate referred to, separating sulphur from the sour gas in the form of hydrogen sulphide, adding a part of said hydrogen sulphide to the gases from the sludge decomposition zone, burning the mixture, reacting in a separate zone sufficient amounts of the resulting sulphur dioxide gas with the remainder of the hydrogen sulphide to produce free sulphur and converting the remainder of the sulphur dioxide to sulphuric acid for reuse in the process, the amount of hydrogen sulphide added to the acid sludge gases being sufficient to form enough sulphur dioxide to (1) make up for losses of sulphur in the system, and (2) react with the remainder of the hydrogen sulphide to produce free sulphur.

THOMAS CLIFFORD OLIVER.